(12) United States Patent
Walling-McGarity et al.

(10) Patent No.: US 11,138,574 B2
(45) Date of Patent: Oct. 5, 2021

(54) SYSTEMS AND METHODS FOR PROTECTING DIGITAL MEDIA

(71) Applicants: Tiffany Walling-McGarity, Brooklyn, NY (US); John McGarity, Brooklyn, NY (US); Jennifer Walling, San Francisco, CA (US)

(72) Inventors: Tiffany Walling-McGarity, Brooklyn, NY (US); John McGarity, Brooklyn, NY (US); Jennifer Walling, San Francisco, CA (US)

(*) Notice: Subject to any disclaimer, the term of this patent is extended or adjusted under 35 U.S.C. 154(b) by 278 days.

(21) Appl. No.: 15/435,764

(22) Filed: Feb. 17, 2017

(65) Prior Publication Data
US 2018/0241567 A1 Aug. 23, 2018

(51) Int. Cl.
| | | |
|---|---|---|
| *H04L 9/00* | (2006.01) | |
| *H04L 9/32* | (2006.01) | |
| *G06Q 20/10* | (2012.01) | |
| *G06F 21/10* | (2013.01) | |
| *H04N 21/4405* | (2011.01) | |
| *H04N 21/835* | (2011.01) | |
| *H04N 21/6334* | (2011.01) | |
| *H04N 21/254* | (2011.01) | |
| *H04N 21/2347* | (2011.01) | |

(52) U.S. Cl.
CPC .......... *G06Q 20/10* (2013.01); *G06F 21/10* (2013.01); *H04N 21/2347* (2013.01); *H04N 21/2541* (2013.01); *H04N 21/4405* (2013.01); *H04N 21/63345* (2013.01); *H04N 21/835* (2013.01); *G06Q 2220/18* (2013.01)

(58) Field of Classification Search
CPC .... H04L 9/00; H04L 9/32; H04K 1/00; G06F 11/00; G06Q 30/00; G06Q 50/00
USPC .............. 705/59, 310, 26.1; 395/186; 726/5
See application file for complete search history.

(56) References Cited

U.S. PATENT DOCUMENTS

| | | | |
|---|---|---|---|
| 5,892,900 A * | 4/1999 | Ginter ................... | G06Q 20/12 726/26 |
| 6,957,195 B1 * | 10/2005 | Kenyon ................. | G06F 21/10 705/50 |
| 8,281,407 B2 | 10/2012 | Ryan, Jr. et al. | |

(Continued)

FOREIGN PATENT DOCUMENTS

| | | |
|---|---|---|
| EP | 2341657 A1 | 7/2011 |
| WO | 9809209 A1 | 3/1998 |

OTHER PUBLICATIONS

Ron White, How Computers Work, Oct. 15, 2003, Que Publishing, 7th Ed, p. 4.*

(Continued)

*Primary Examiner* — John W Hayes
*Assistant Examiner* — Nakia Leffall-Allen
(74) *Attorney, Agent, or Firm* — Carter, DeLuca & Farrell LLP; George Likourezos

(57) ABSTRACT

Disclosed are systems, apparatus, and methods for protecting digital media. An exemplary method includes receiving digital media, encrypting the digital media using an encrypted file format to generate an encrypted file, displaying a context menu when the encrypted file is accessed, the context menu including a licensing screen, enabling a user to obtain a license to the digital media using the licensing screen of the context menu, and configuring the encrypted file to enable access to the digital media based on a term of the license.

19 Claims, 4 Drawing Sheets

(56) References Cited

U.S. PATENT DOCUMENTS

| | | | |
|---|---|---|---|
| 8,296,190 B1* | 10/2012 | Lemmons | G06Q 30/06 705/26.1 |
| 8,645,687 B2 | 2/2014 | Taylor | |
| 8,874,487 B2* | 10/2014 | Ronning | G06Q 20/1235 705/59 |
| 2002/0010681 A1* | 1/2002 | Hillegass | G06Q 20/06 705/59 |
| 2002/0154157 A1* | 10/2002 | Sherr | G06F 21/10 715/716 |
| 2004/0151311 A1 | 8/2004 | Hamberg et al. | |
| 2005/0114265 A1* | 5/2005 | Satkunanathan | G06Q 20/3674 705/59 |
| 2005/0278542 A1* | 12/2005 | Pierson | H04L 63/0876 713/182 |
| 2006/0021012 A1* | 1/2006 | Ito | G06F 21/608 726/5 |
| 2007/0100757 A1* | 5/2007 | Rhoads | G06F 21/10 705/51 |
| 2007/0219920 A1* | 9/2007 | Shin | G06F 21/10 705/59 |
| 2009/0089869 A1* | 4/2009 | Varghese | G06Q 20/4014 726/7 |
| 2009/0282257 A1 | 11/2009 | Senshu | |
| 2012/0290420 A1* | 11/2012 | Close | G07G 1/14 705/17 |
| 2014/0279106 A1 | 9/2014 | Smelcer | |
| 2014/0310264 A1 | 10/2014 | D'Ambrosio | |
| 2016/0012465 A1* | 1/2016 | Sharp | G06Q 20/386 705/14.17 |
| 2016/0203572 A1 | 7/2016 | McConaghy et al. | |

OTHER PUBLICATIONS

International Search Report and Written Opinion dated Mar. 16, 2018 in corresponding International Application No. PCT/US2018/018702.

European Search Report issued by the European Patent Office in relation to counterpart European Patent Application No. 18753784.0, dated Nov. 9, 2020.

* cited by examiner

SYSTEMS AND METHODS FOR PROTECTING DIGITAL MEDIA

BACKGROUND

Technical Field

The present disclosure relates to the protection of digital media, and more particularly, to systems and methods for encrypting digital media files and preventing unauthorized use and distribution of the digital media.

Description of Related Art

Digital media, such as images and videos, are commonly published, shared, and otherwise used in digital and print media. Artists and photographers (hereinafter referred to as "content creators") often publish their works on websites for self-promotion and/or to solicit interest from potential licensees. While copyright automatically attaches to such images as soon as they are fixed in a tangible form of expression, and thus cannot legally be copied, published, or otherwise distributed without a license or authorization from the content creator, a copyright does not in itself prevent unauthorized use of digital media, and only provides legal recourse to content creators when their work is misappropriated. Thus, independent content creators are often left with the dilemma that they risk having their digital media misappropriated if they publish them, but they also cannot solicit interest from potential licensees if the potential licensees cannot first see the media. While the concept of watermarking digital media to protect the media from unauthorized reproduction is well known in the art, such watermarking is not a perfect solution and is often undesirable, such as when an unobscured image or video is sought to be promoted. Digital watermarking, which embeds ownership information in a digital media file without obscuring the media is also known, but merely ensures that the ownership information is retained in the digital media file even if the file is copied, and does not prevent unauthorized copying of the digital media file. As such, improvements are required in the way that digital media are protected. Disclosed hereinbelow are improvements in systems and methods for protecting digital media to prevent unauthorized use or distribution of the digital media.

SUMMARY

Provided in accordance with the present disclosure is a method for protecting digital media. In an aspect of the present disclosure, the method includes receiving digital media, encrypting the digital media using an encrypted file format to generate an encrypted file, displaying a context menu when the encrypted file is accessed, the context menu including a licensing screen, enabling a user to obtain a license to the digital media using the licensing screen of the context menu, and configuring the encrypted file to enable access to the digital media based on a term of the license.

In another aspect of the present disclosure, the digital media is one or more of a still image, a moving image, a video, a photograph, an audio recording, a text document, a drawing, and a painting.

In yet another aspect of the present disclosure, the encrypted file includes a tracker, and wherein the method further comprises tracking the encrypted file using the tracker.

In a further aspect of the present disclosure, the tracker is an executable code.

In another aspect of the present disclosure, the method further includes displaying a list of web addresses where the tracker is tracked.

In yet another aspect of the present disclosure, the encrypted file includes the digital media and a thumbnail image of the digital media.

In a further aspect of the present disclosure, the method further includes displaying the thumbnail image when the encrypted file is accessed prior to being configured to enable access to the digital media based on a term of the license.

In another aspect of the present disclosure, the encrypted file further includes metadata.

In a further aspect of the present disclosure, the metadata includes one or more of a name of a creator of the digital media, contact information of the creator, a time when the digital media was created, a location where the digital media was created, information regarding equipment used to create the digital media, a title of the digital media, and a subject of the digital media.

In another aspect of the present disclosure, the licensing screen of the context menu enables the user to obtain a license including predetermined license terms.

In yet another aspect of the present disclosure, the licensing screen of the context menu enables the user to customize terms of the license.

In a further aspect of the present disclosure, the terms of the license may be customized based on one or more of a duration of the license, a use of the digital media, a resolution of the digital media, a geographic location, an exclusivity agreement, a number of copies, and a number of views.

In yet a further aspect of the present disclosure, the use of the digital media is one or more of a digital publication, a printed publication, a limited-edition publication, and a private publication.

In another aspect of the present disclosure, the method further includes configuring the encrypted file to allow printing of the digital media based on the customized number of copies.

In yet another aspect of the present disclosure, the method further includes configuring the encrypted file to prevent printing of the digital media after the customized number of copies has been reached.

In still another aspect of the present disclosure, the method further includes preventing display of the digital media after the customized number of views has been reached.

In another aspect of the present disclosure, the encrypted file includes an encryption key associated with a term of the license, and wherein configuring the encrypted file to enable access to the digital media based on a term of the license includes configuring the encrypted file to be decryptable based on the encryption key.

In a further aspect of the present disclosure, the encrypted file is configured to be decryptable based on the encryption key for a number of times included in the license.

In another aspect of the present disclosure, the method further includes displaying the context menu when the encrypted file is accessed after the license expires, enabling a user to obtain a new license to the digital media using the licensing screen of the context menu, and configuring the encrypted file to enable access to the digital media based on a term of the new license.

In a further aspect of the present disclosure, the encrypted file includes an encryption key associated with a term of the new license, and wherein configuring the encrypted file to enable access to the digital media based on a term of the new license includes configuring the encrypted file to be decryptable based on the encryption key.

In another aspect of the present disclosure, the method further includes generating a copyright registration application form based on the digital media, and submitting the copyright registration application form and a copy of the digital media to the United States Copyright Office.

In yet another aspect of the present disclosure, the method further includes displaying a thumbnail of the digital media on a website, enabling a user to download the encrypted file when the thumbnail of the digital media is selected, granting the user an automatic license to the digital media when the encrypted file is downloaded, and configuring the encrypted file to enable access to the digital media based on a term of the automatic license.

In a further aspect of the present disclosure, the user is required to have an account including a payment method with the website to enable the user to download the encrypted file, and wherein the payment method included in the user's account with the web site is debited based on a term of the automatic license when the user downloads the encrypted file.

Provided in accordance with the present disclosure is a non-transitory computer-readable storage medium storing a program for protecting digital media. In an aspect of the present disclosure, the program includes instructions which, when executed by a processor, cause a computer to receive digital media, encrypt the digital media using an encrypted file format to generate an encrypted file, and configure the encrypted file to display a context menu when the encrypted file is accessed, the context menu including a licensing screen, enable a user to obtain a license to the digital media using the licensing screen of the context menu, and enable access to the digital media based on a term of the license.

Provided in accordance with the present disclosure is an apparatus for protecting digital media. In an aspect of the present disclosure, the apparatus includes a processor, and a memory storing instructions which, when executed by the processor, cause the apparatus to receive digital media, encrypt the digital media using an encrypted file format to generate an encrypted file, and configure the encrypted file to display a context menu when the encrypted file is accessed, the context menu including a licensing screen, enable a user to obtain a license to the digital media using the licensing screen of the context menu, and enable access to the digital media based on a term of the license.

Any of the above aspects and embodiments of the present disclosure may be combined without departing from the scope of the present disclosure.

BRIEF DESCRIPTION OF THE DRAWINGS

Various aspects and features of the present disclosure are described hereinbelow with references to the drawings, wherein.

DETAILED DESCRIPTION

The present disclosure relates to systems, apparatus, and methods for protecting digital media. In particular, the disclosure relates to methods of encrypting digital media files to prevent unauthorized use or distribution of the digital media, and providing a context menu with a licensing screen built-in to the encrypted file to enable potential licensees of the digital media to obtain a license directly in the context menu. The encrypted file may then be configured to allow access to the digital media based on terms of the license obtained using the context menu. Thus, when a potential licensee receives an encrypted digital media file, the potential licensee may obtain a license, with terms either predetermined by the content creator or customized by the potential licensee, without having to resort to other methods of having to find and contact the content creator, either directly or via a centralized copyright and/or licensing database, to obtain a license to the digital media. As such, the systems, apparatus, and methods disclosed herein not only protect the digital media from unauthorized duplication and/or use, but also simplify the process for potential licensees to obtain a license to use the digital media.

Figure 1:
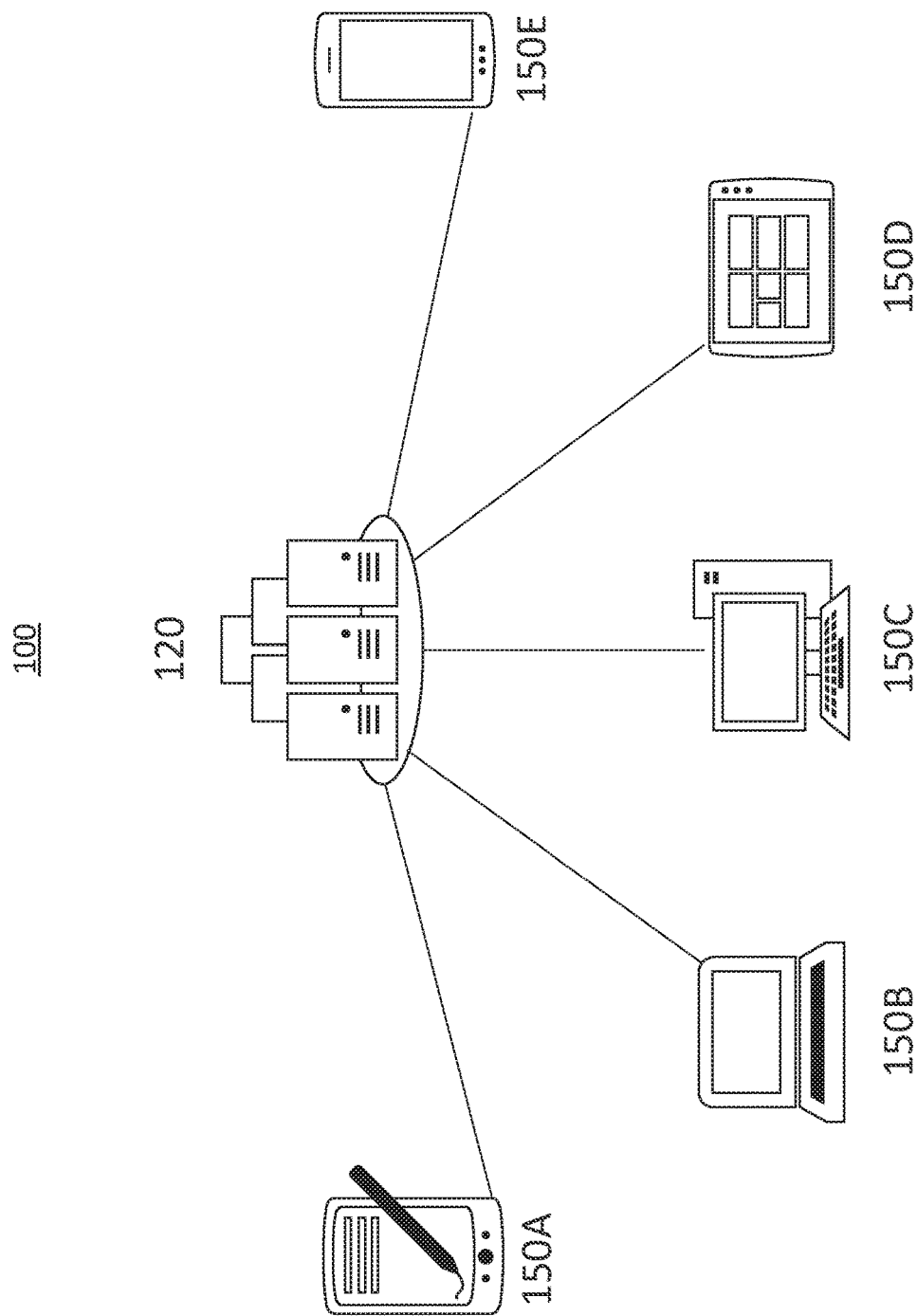
FIG. 1 is a schematic diagram of an exemplary system for protecting digital media, according to an embodiment of the present disclosure.

With reference to FIG. 1, there is shown a schematic diagram of an exemplary system 100 which may be used for protecting digital media, according to an embodiment of the present disclosure. System 100 includes at least one server 120 and a plurality of user devices 150A, 150b, 150C, 150D, and/or 150E, referred to hereinafter collectively as "user devices 150."

Server 120 may be any computing device configurable to act as a service provider, including a single dedicated server, an array of servers, and/or a cloud-based server. As described further below, server 120 may be configured to encrypt digital media files, provide a database of available digital media files that are available for licensing, and maintain a database of encryption keys associated with particular encrypted files and licenses for such encrypted files.

User devices 150 may be any computing device or digital content creation device known to those skilled in the art. For example, user devices 150 may include tablet computers 150A, laptop computers 150B, desktop computers 150C, slate devices 150D, and/or smart phones 150E. Additionally, user devices 150 may include cameras, either as dedicated devices or included in a general-purpose computing device such as a smart phone 150E. The user devices 150 described herein may thus be used by both content creators to create digital media and/or provide digital media files to server 120, and by potential licensees to acquire encrypted files and licenses to the digital media included in the encrypted files. User devices 150 may be connected to server 120 via a network such as the internet.

Figure 2:
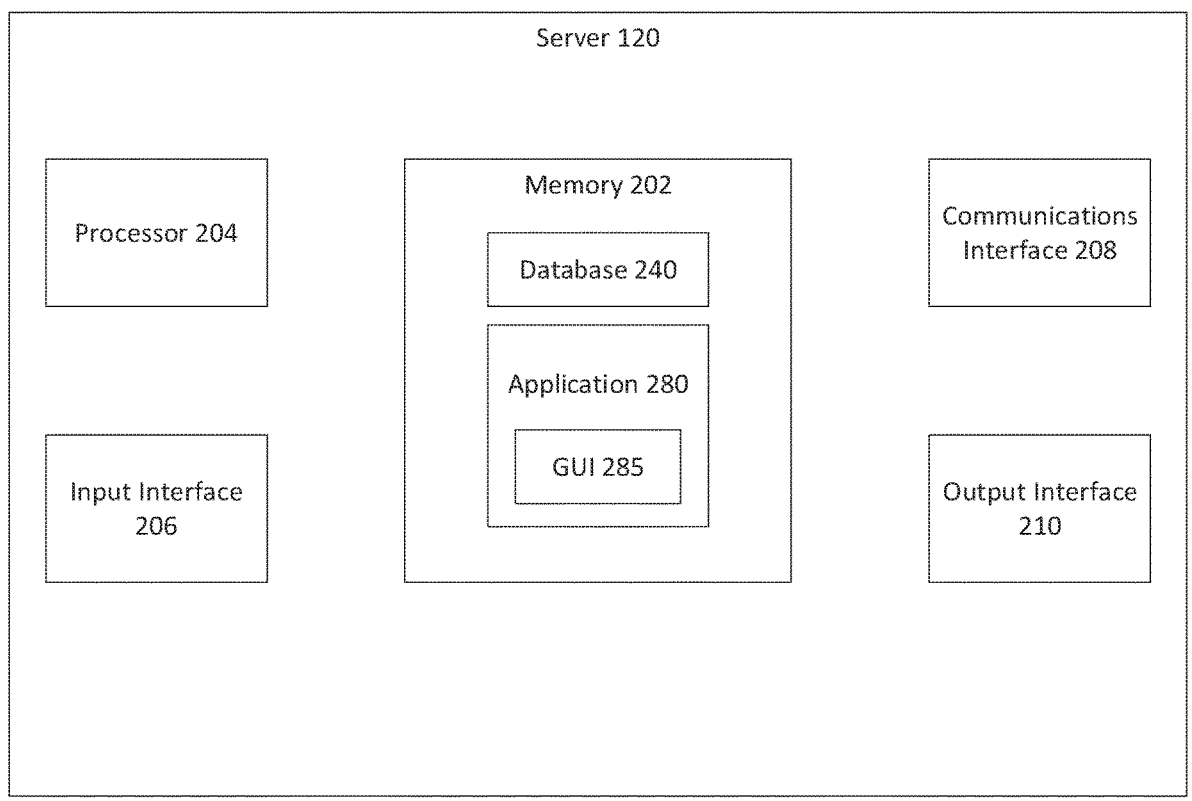
FIG. 2 is a block diagram of an exemplary computing device forming part of the system of FIG. 1, according to an embodiment of the present disclosure.

Turning now to FIG. 2, there is shown a schematic diagram of a server 120 forming part of system 100 of FIG. 1, according to an embodiment of the present disclosure. Server 120 may include a memory 202 storing a database 240 and an application 280. Application 280 may include instructions that, when executed by a processor 204, cause server 120 to perform various functions, as described below. Application 280 may further include a graphical user interface (GUI) 285.

Memory 202 may include any non-transitory computer-readable storage medium for storing data and/or software that is executable by processor 204 and which controls the operation of server 120. In an embodiment, memory 202 may include one or more solid-state storage devices such as flash memory chips. Alternatively, or in addition to the one or more solid-state storage devices, memory 202 may include one or more mass storage devices connected to the processor 204 through a mass storage controller (not shown) and a communications bus (not shown). Although the description of computer-readable media contained herein refers to a solid-state storage, it should be appreciated by those skilled in the art that computer-readable storage media can be any available media that can be accessed by processor 204. That is, computer readable storage media include non-transitory, volatile and non-volatile, removable and non-removable media implemented in any method or technology for storage of information such as computer-readable instructions, data structures, program modules or other data. For example, computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by server 120.

Server 120 may further include an input interface 206, a communications interface 208, and an output interface 210. User interface may be a mouse, keyboard, or other handheld controller, touch screen, voice interface, and/or any other device or interface by means of which a user may interact with server 120.

Communications interface 208 may be configured to connect to a network such as a local area network (LAN) consisting of a wired network and/or a wireless network, a wide area network (WAN), a wireless mobile network, a Bluetooth network, and/or the interne. Output interface 210 may be a screen or other display device usable to output images or data by server 120.

Figure 3A:
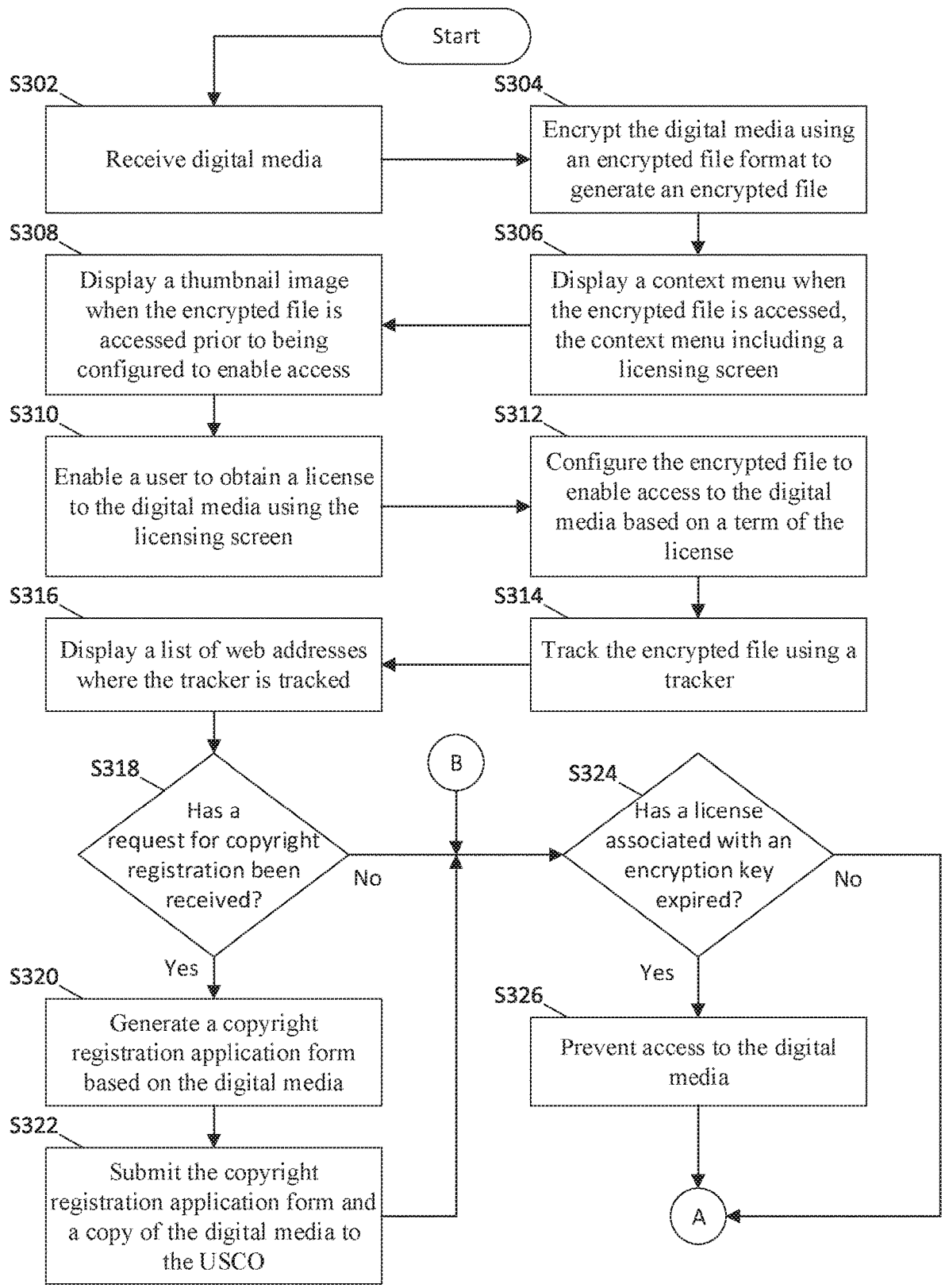
FIGS. 3A and 3B show a flowchart of an exemplary method for protecting digital media, according to an embodiment of the present disclosure.
Figure 3B:
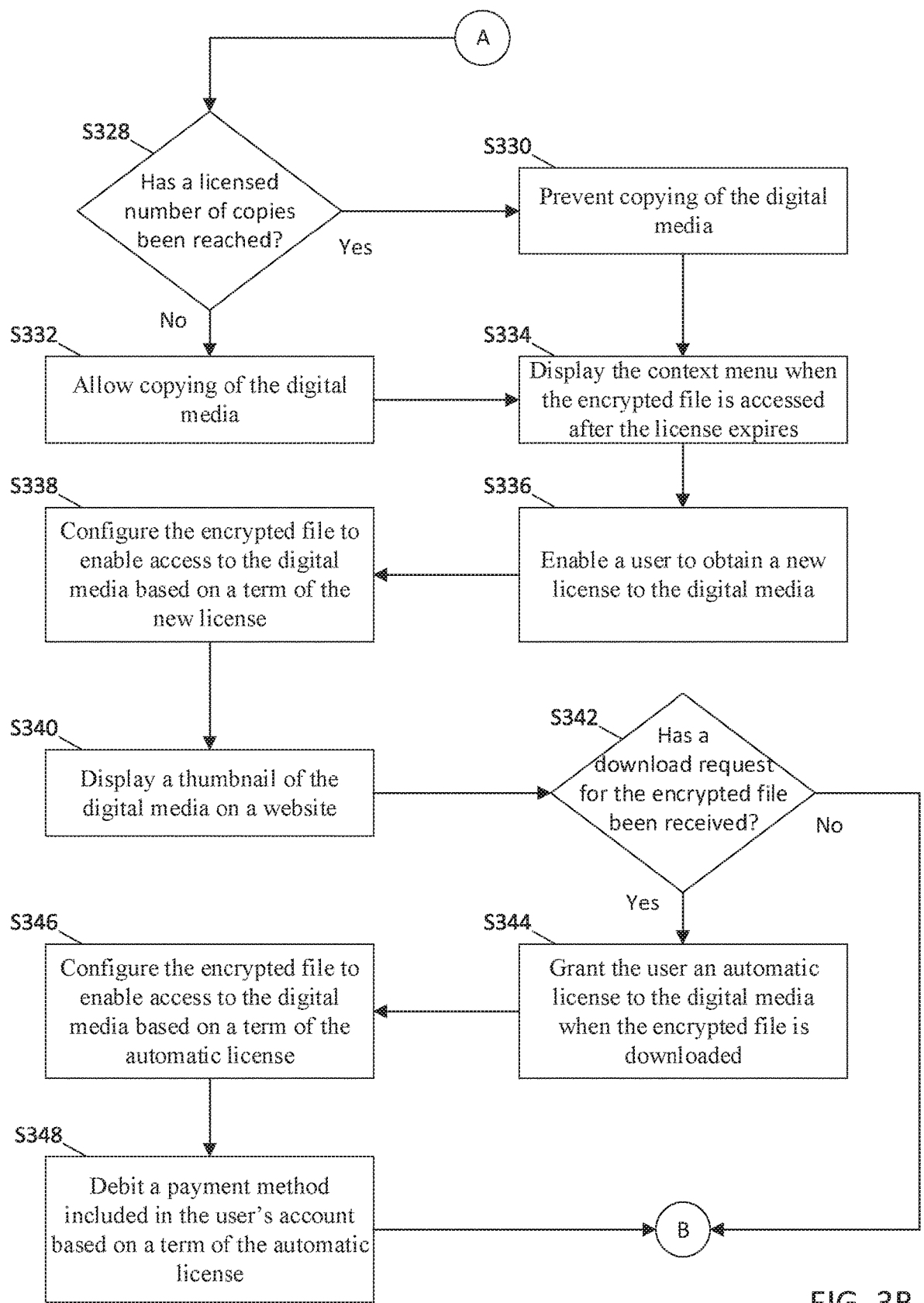

With reference to FIG. 3, there is shown a flowchart of an exemplary method 300 for protecting digital media, according to an embodiment of the present disclosure. While the below-described steps of method 300 are described in an exemplary sequence or order of operations, those skilled in the art will recognize that some or all of these steps may be performed in a different sequence or order of operations, or may be duplicated or omitted, without departing from the scope of the present disclosure.

Starting at step S302, server 120 may receive a digital media file from a user device 150. The digital media may include still images, moving images, videos, photographs, drawings, paintings, audio recordings, virtual reality renderings and/or other augmented or virtual reality files, documents including architectural drafts, manuscripts, movie scripts, play scripts, and/or any other form of digital media known to those skilled in the art.

Server 120 may then, at step S304, encrypt the digital media using an encrypted file format to generate an encrypted file. The encrypted file may include the digital media file, a thumbnail image of the digital media, a tracker (described below). The encrypted file may further include various metadata associated with the digital media, including a name of the content creator, contact information for the content creator, a date and/or time when the digital media was created, a location where the digital media was created, information regarding equipment used to create the digital media, a title of the digital media, a subject of the digital media, and/or any other type of metadata relevant to digital media known to those skilled in the art. Additionally, as described further below, license and/or contract terms may also be included in the encrypted file, as separately stored data and/or included in the metadata.

At some point after the digital media is encrypted by server 120, and the encrypted file is distributed, whether via a website or other content distribution service provided by server 120, or by a user device 150 used by the content creator, a user, such as a potential licensee, using another user device 150 may access the encrypted file. A context menu may then be displayed, at step S306. The context menu may include a licensing screen by means of which the user may obtain a license to the digital media. By using the licensing screen of the content menu, the user may obtain a license to the digital media directly by accessing the encrypted file. The encrypted file may interface with server 120 over the internet to coordinate issuance and maintenance of licenses for the digital media included in the encrypted file. The licensing screen of the context menu may be customizable based on license terms accepted by the content creator. For example, the content creator may only allow licenses for viewing of the digital media and not for copying of the digital media, etc. In another example, the content provider may only allow licenses for digital display of the digital media, and not for printed display, etc. Thus, in some embodiments, the licensing screen of the context menu may be fixed with predetermined license terms set by the content creator, while in other embodiments, the licensing screen may be customizable according to license terms requested by the user. For example, the license terms may be customized based on a duration of the license, a type of use of the digital media, a resolution of the digital media, a geographic location of the licensee and/or where the license will be valid, an exclusivity agreement, a number of copies allowed, and/or a number of views allowed. The terms of the license may also be customizable based on the type of use requested by the user, such as digital publication, printed publication, limited-edition publication, private publication, etc. The terms of the license may further be customized based on whether a right to modify the digital media is included in the license, the types of modifications and/or derivative works permitted by the license. Additionally, the terms of the license may specify whether any particular uses are expressly prohibited. A unique encryption key may be associated with the license, and may be used by the user to decrypt the encrypted file according to the terms of the license.

In addition, the thumbnail image of the digital media may be displayed, at step S308, when the encrypted file is accessed prior to being configured to enable access to the digital media, as described below. The licensing screen of the context menu enables the user to obtain a license to the digital media at step S310. Thereafter, at step S312, the encrypted file is configured to enable access to the digital media. For example, the encrypted file may include executable code that, when a license has been obtained, configures the encrypted file to enable access to the digital media, such as to be decryptable via an encryption key associated with the license. In another embodiment, server 120 configures the encrypted file to enable access to the digital media. Server 120 maintains, in database 240, a list of encryption keys associated with each encrypted file and the licenses to such encrypted file.

Server 120 may further track the encrypted file, at step S314, using the tracker included in the encrypted file. For example, the tracker may be executable code that is executed upon access of the encrypted file. The executable code may send a notification to server 120 when the encrypted file is accessed. The notification may include information regarding the location of the encrypted file, such as a device identification of the user device 150 on which the encrypted file is located, a web address of a web site where the encrypted file is published, etc. Server 120 may then, at step S316, display and maintain a list of locations and/or web addresses where the tracker included in the encrypted file is tracked.

Next, at step S318, server 120 determines whether a request for copyright registration of the digital media has been received. For example, when the digital media is provided to server 120, the content creator may include a request that the digital media be registered with the United States Copyright Office, and/or with another country or governmental or regulatory agency's copyright registration service. If it is determined that a request for copyright registration has been received, processing proceeds to step S320, where server 120 generates a copyright application form based on the digital media.

Thereafter, at step S322, server 120 may submit the copyright registration application form, along with a copy of the digital media and any requisite fees, to the United States Copyright Office, and/or the other country or governmental or regulatory agency's copyright registration service. Thereafter, or if it is determined at step S318 that a request for copyright registration was not received, processing proceeds to step S324, where it is determined whether a license associated with a particular encryption key has expired.

As described above in step S306, the license obtained by the user may include a predetermined and/or a customizable amount of views, time, etc., based on the license terms selected by the user. The license is associated with a particular encryption key. Thus, the status of a license may be tracked and maintained based on usage of the encryption key. When the encrypted file is accessed, the user will be required to provide an encryption key associated with a valid license to the digital media included in the encrypted file. It may then be verified that the license associated with the provided encryption key is valid prior to allowing access to the digital media. For example, the encrypted file may include executable code that maintains a record of each time the digital media is accessed, and verifies that a licensed number of views associated with a provided encryption key have not been reached before allowing access to the digital media. Likewise, the executable code may determine whether a licensed period of time associated with a provided encryption key has not expired before allowing access to the digital media.

In another embodiment, server 120 maintains, in database 240, a record of each time an encrypted file is accessed and verifies that the licensed number of views or period of time allowed by the license associated with the provided encryption key has not been reached or expired before allowing access to the digital media. Thus, if it is determined that the license associated with the provided encryption key has expired, processing proceeds to step S326, where access to the digital media is prevented. For example, the encrypted file may include executable code to configure the encrypted file to prevent decryption by an encryption key for which the associated license has expired. In another embodiment, server 120 configures the encrypted file to prevent decryption by an encryption key for which the associated license has expired. Preventing access to the digital media may further include locking the encrypted file, deleting the encrypted file, corrupting the encrypted file, and/or any other method of preventing access to a file known to those skilled in the art. Thereafter, or if it is determined at step S324 that the license associated with a particular encryption key has not expired, access to the encrypted file is allowed, and processing proceeds to step S328.

At step S328, it is determined whether a licensed number of copies allowed by a license associated with the provided encryption key have been printed. For example, similar to the tracking of the number of views and time allowed by the license, as described above with reference to step S324, a number of copies allowed by the license may be tracked. In embodiments, the encrypted file may be configured to allow copying, whether by duplicating or printing, of the digital media only if the license allows such copying, and only for the licensed number of copies. The encrypted file may further be configured to interface with a printer, either directly or via an intermediary software application, to track the number of copies printed by a particular encryption key, and to prevent copying of the digital media if the license associated with the provided encryption key does not allow copying. Thus, if it is determined that the licensed number of copies has been reached, or that the license associated with the provided encryption key does not allow copying, processing proceeds to step S330, where copying of the digital media is prevented. Alternatively, if it is determined that the license associated with the provided encryption key allows copying and that the licensed number of copies has not been reached, processing proceeds to step S332, where copying of the digital media is allowed. Thereafter, processing proceeds to step S334.

After a license associated with a particular encryption key expires, or when an unlicensed use of the digital media is requested, the encrypted file may, at step S334, cause user device 150 to display the context menu including the licensing screen. Thus, while the unlicensed use of the digital media is prevented, the encrypted file enables the user, at step S336, to obtain a new license to the digital media directly by accessing the encrypted file. If the user obtains a new license to the digital media, the encrypted file may be configured, at step S338, to allow access to the digital media based on the terms of the new license, similar to the configuration of the encrypted file at step S312. In particular, the encrypted file may be configured to be decryptable by a new encryption key associated with the new license.

As noted above, in addition to direct distribution of the encrypted file by the content creator, the encrypted file may also be distributed by a website associated with server 120. For example, server 120 may maintain a database of all digital media files server 120 has encrypted, and operate a website to allow potential licensees to obtain the encrypted files. Server 120 may display, at step S340, the thumbnail of the digital media included in the encrypted file on the website. Users may be required to have an account with the website to be able to view the thumbnail of the digital media and/or download the encrypted file. The user account may include a payment method.

At step S342, server 120 determines whether a download request has been received for the encrypted file. If a download request has been received, processing proceeds to step S344, where the user is granted an automatic license to the digital media when the encrypted file is downloaded from the website. For example, the user may be granted an automatic limited license to the digital media for a predetermined number of views and/or a predetermined amount of time, as configured by the content creator. The user may be given an encryption key associated with the automatic limited license to enable the user to decrypt the encrypted file. The encrypted file may then be configured, at step S346, to enable access to the digital media based on the terms of the automatic license, similar to the configuration of the encrypted file at step S312. If there is a cost associated with the automatic license, the payment method associated with the user's account may be debited at step S348. The cost may be configured by the content creator, and the user may be prompted about the charge before the payment method is debited. Thereafter, or if it is determined at step S342 that a download request for the encrypted file has not been received, processing returns to step S324.

Detailed embodiments of devices, systems incorporating such devices, and methods using the same as described herein. However, these detailed embodiments are merely examples of the disclosure, which may be embodied in various forms. Therefore, specific structural and functional details disclosed herein are not to be interpreted as limiting, but merely as a basis for the claims and as a representative basis for allowing one skilled in the art to variously employ the present disclosure in appropriately detailed structure.

What is claimed is:

1. A digital media protection method for use in a digital media protection system that protects access to digital media, the digital media protection method comprising:
    receiving digital media at a server from a first user device;
    generating an encrypted file by:
        encrypting the digital media at the server using an encrypted file format, wherein the encrypted file includes a tracker, the tracker including executable code, wherein the executable code is executed upon access of the encrypted file, and
    wherein the encrypted digital media includes a thumbnail of the digital media;
    accessing, on a second user device, the encrypted file;
    executing the executable code of the tracker on the second user device, in response to the accessing;
    transmitting by the second user device a notification to the server based on the second user device attempting to access the encrypted file, wherein the notification includes a location of the encrypted file, the location including a device identification of a user device on which the encrypted file is located, and a web address of a web site where the encrypted file is published;
    receiving a notification, at the server, in response to the executable code of the tracker being executed on the second user device;
    transmitting, by the server, a list of web addresses tracked by the digital media server, and the location tracked by the server, to a first user device;
    displaying, on the first user device, the list of web addresses tracked by the server and the location tracked by the server;
    accessing, on the second user device, the encrypted file;
    transmitting, by the server, a context menu to the second user device, the context menu including a licensing screen;
    displaying, on the second user device, the context menu including the licensing screen;
    receiving information, at the server, from the first user device indicating that the user has obtained a license to the digital media using the licensing screen of the context menu;
    enabling, via executable code of the tracker, the digital media to be displayed on the second user device based on a term of the license; and
    displaying, on the second user device, the digital media based on the term of the license.

2. The method according to claim 1, wherein the digital media is one or more of:
    a still image;
    a moving image;
    a video;
    a photograph;
    an audio recording;
    a text document;
    a drawing; and
    a painting.

3. The method according to claim 1, wherein the encrypted file includes the digital media.

4. The method according to claim 3, further comprising:
    accessing the encrypted file by the second user device prior to the server permitting the second user device to display the digital media on the display of the second user device based on a term of the license by decrypting the thumbnail of the digital media; and
    displaying, on the second user device, the thumbnail of the digital media based on the accessing.

5. The method according to claim 3, wherein the encrypted file further includes metadata.

6. The method according to claim 5, wherein the metadata includes one or more of:
    a name of a creator of the digital media;
    contact information of the creator;
    a time when the digital media was created;
    a location where the digital media was created;
    information regarding equipment used to create the digital media;
    a title of the digital media; and
    a subject of the digital media.

7. The method according to claim 1, further comprising obtaining a license including predetermined license terms by the licensing screen of the context menu.

8. The method according to claim 1, wherein the licensing screen of the context menu enables customization of terms of the license.

9. The method according to claim 8, wherein the terms of the license may be customized based on one or more of:
    a duration of the license;
    a use of the digital media;
    a resolution of the digital media;
    a geographic location;
    an exclusivity agreement;
    a number of copies; and
    a number of views.

10. The method according to claim 9, wherein the use of the digital media is one or more of:
    a digital publication;
    a printed publication;
    a limited-edition publication; and
    a private publication.

11. The method according to claim 9, further comprising:
    determining, via the server, if a predetermined quantity of copies has been reached based on the terms of the license; and
    preventing, via the server, printing of the digital media based on the determination and the encryption.

12. The method according to claim 11, further comprising preventing, via the encryption, displaying of the digital media based on the determination.

13. The method according to claim 1, further comprising:
    accessing, by the second user device, the encrypted file after the license expires;
    displaying the context menu, on the second user device;
    obtaining a new license to the digital media using the licensing screen of the context menu; and
    decrypting the digital media based on a term of the new license.

14. The method according to claim 13, wherein the encrypted file includes an encryption key associated with a term of the new license,
wherein configuring the encrypted file enabling access to the digital media based on a term of the new license,
wherein the method further includes decrypting the encrypted file based on the encryption key.

15. The method according to claim 1, further comprising:
displaying a thumbnail of the digital media on a website;
selecting the thumbnail of the digital media;
downloading the encrypted file via a website associated with the server;
granting the user an automatic license to the digital media in a case where the encrypted file is downloaded; and
decrypting the encrypted file based on a term of the automatic license.

16. The method according to claim 15, wherein the method further includes:
determining if the user has an account including a payment method with the website enabling the user to download the encrypted file;
determining if the user downloads the encrypted file; and
debiting the user's account with the website by a payment method included in the user's account based on a term of the automatic license based on the determination.

17. A non-transitory computer-readable storage medium storing a computer-executable program for causing a system to protect digital media, the system comprising a server, a first user device and a second user device, to perform the steps of:
receiving digital media at the server from the first user device;
generating an encrypted file by:
encrypting the digital media at the server using an encrypted file format, wherein the encrypted file includes a tracker, the tracker including executable code configured to be executed upon access of the encrypted file, and wherein the encrypted digital media includes a thumbnail of the digital media;
accessing, on the second user device, the encrypted file;
executing the executable code of the tracker on the second user device, in response to the accessing;
transmitting by the second user device a notification to the server based on the second user device attempting to access the encrypted file, wherein the notification includes a location of the encrypted file, the location including a device identification of a user device on which the encrypted file is located, and a web address of a web site where the encrypted file is published;
receiving information, at the server, in response to the executable code of the tracker being executed on the second user device;
transmitting, by the server, a list of web addresses tracked by the digital media server, and the location tracked by the server, to a first user device;
displaying, on the first user device, the list of web addresses tracked by the digital media server and the location tracked by the server;
accessing, on the second user device, the encrypted file;
transmitting, by the server, a context menu to the second user device, the context menu including a licensing screen;
displaying, on the second user device, the context menu including the licensing screen;
receiving information from the first user device indicating that the user has obtained a license to the digital media using the licensing screen of the context menu;
enabling, via the executable code of the tracker, the digital media to be displayed on the second user device based on a term of the license; and
displaying, on the second user device, the digital media based on the term of the license.

18. A system for protecting digital media, the system comprising:
a server having a processor and a memory storing instructions thereon;
a first user device;
a second user device;
wherein the instructions, when executed by the processor, cause the system to perform the steps of:
receiving digital media at the server from the first user device;
generating an encrypted file by:
encrypting the digital media at the digital media server using an encrypted file format, wherein the encrypted file includes a tracker, the tracker including executable code, wherein the executable code is executed upon access of the encrypted file, and
wherein the encrypted digital media includes a thumbnail of the digital media;
accessing, on a second user device, the encrypted file;
executing the executable code of the tracker on the second user device, in response to the accessing;
transmitting by the second user device a notification to the server,
wherein the notification includes a location of the encrypted file, the location including a device identification of a user device on which the encrypted file is located, and a web address of a web site where the encrypted file is published;
receiving information, in response to the executable code of the tracker being executed on the second user device;
transmitting a list of web addresses tracked by the digital media server, and the location tracked by the server, to the first user device;
displaying, on the first user device, the list of web addresses tracked by the server and the location tracked by the server;
accessing, on the second user device, the encrypted file;
transmitting, by the server, a context menu to be displayed on a display of the second user device, the context menu including a licensing screen;
displaying, on the second user device, the context menu including the licensing screen;
receiving information from the first user device indicating that the user has obtained a license to the digital media using the licensing screen of the context menu;
enabling, via the executable code of the tracker, the digital media to be displayed on the second user device based on a term of the license; and
displaying, on the second user device, the digital media based on the term of the license.

19. The method according to claim 1, further comprising:
determining if a request for copyright registration has been received;
generating a copyright registration application form based on the digital media; and
submitting the copyright registration application form and a copy of the digital media to the US Copyright Office.

* * * * *